June 16, 1936.     J. E. MONROE     2,044,712
AUTOMATIC OVERLOAD RELEASE CLUTCH
Filed July 27, 1933
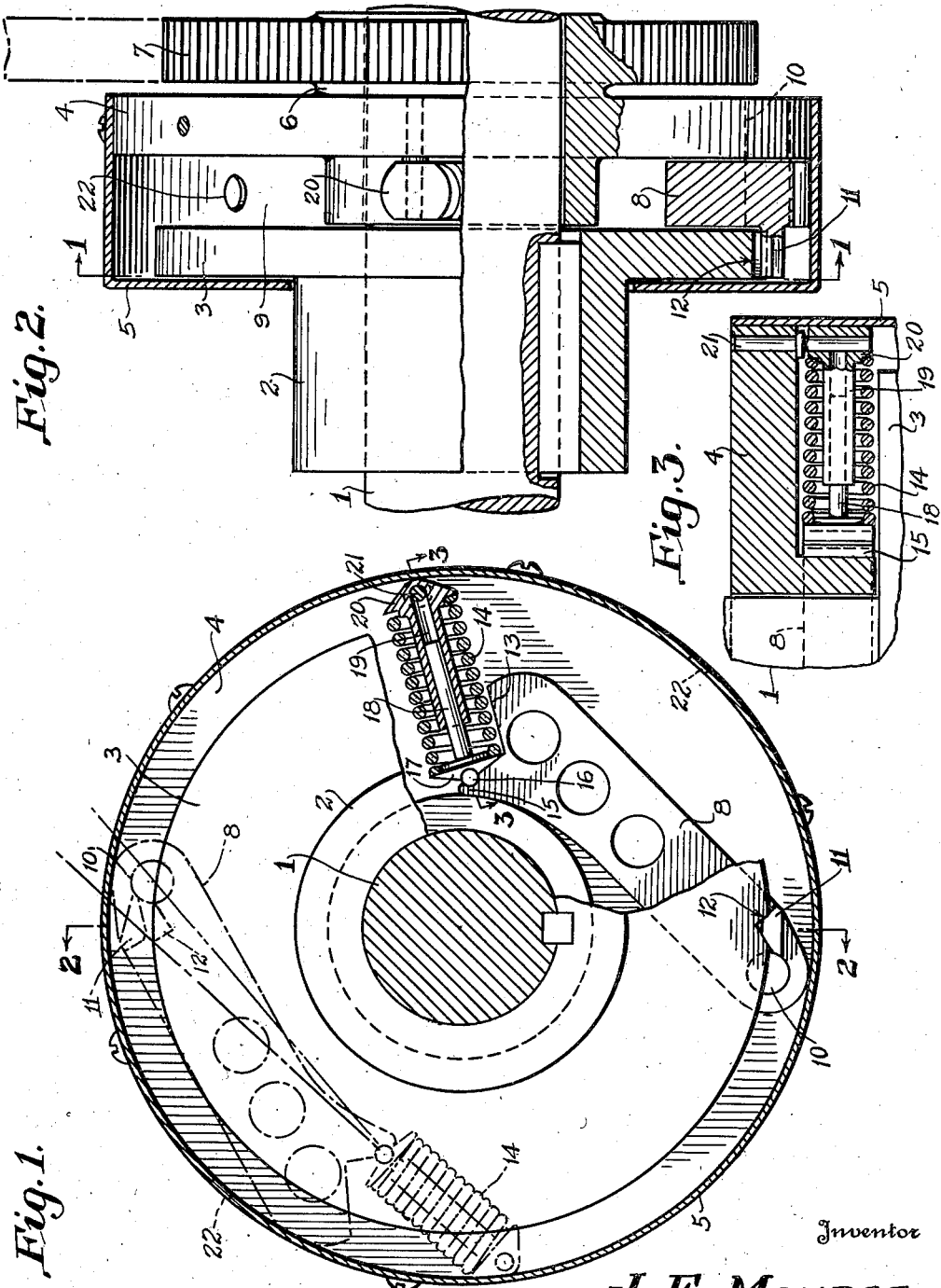
Inventor
J. E. Monroe
By Mason Fenwick Lawrence
Attorneys Patented June 16, 1936

2,044,712

UNITED STATES PATENT OFFICE 2,044,712

AUTOMATIC OVERLOAD RELEASE CLUTCH

John Edgar Monroe, New Orleans, La.

Application July 27, 1933, Serial No. 682,504

3 Claims. (Cl. 192—56)

The invention forming the subject matter of this application is an automatic overload release clutch, designed to provide a compact, simple and automatically effective means operative, when an overload is placed upon a driven machine, to disconnect the machine from a power actuated driving member so as to prevent possible injury to the mechanism of said machine.

The main object of the invention is to provide a device of the character referred to which can be depended upon to disconnect the driven mechanism from its source of power and from its fast moving parts whenever the load exceeds a predetermined safe amount.

A further object of the invention is to provide a device of the character referred to designed to transmit an overload torque at low speeds, as in starting, and which can be set to release the driven mechanism at a minimum operating overload at operating speed.

Still another object of the invention is to provide a device of this character which can be readily reset for operation after its release; and after the cause of its release has been eliminated.

Other objects of the invention will become apparent as the detailed description thereof proceeds.

In the drawing:

Figure 1 is a vertical transverse section through a physical embodiment of the present invention, the section being taken on the line 1—1 of Figure 2;

Figure 2 is a longitudinal section taken on the line 2—2 of Figure 1; and

Figure 3 is a section taken on the line 3—3 of Figure 1.

As shown in the drawing, the shaft 1 is to be considered as a drive shaft connected for rotation to a motor or any other suitable source of power. It may be driven by a belt, chain, or gearing applied to a sleeve 2, which is suitably keyed or fixed to said shaft 1. Some installations may not require the shaft to turn. The sleeve 2 has a flange 3 extending outwardly from one end thereof and perpendicular to the axis of the shaft 1.

A driven disk 4, mounted to rotate on the shaft 1, is larger in diameter than the flange 3 of the sleeve 2, and has detachably secured to its periphery a protective cover or casing 5 which extends over and around the flange 3 of the sleeve 2. A hub 6 extends from the center of the disk 4 and embraces the shaft 1 as a sleeve. This hub 6 may have connected thereto or formed integral therewith a gear 7 adapted to be operably connected to power transmission gearing of the machine to be operated. However, any other suitable means may be used to connect the said machine operably to the driven disk 4.

To impart rotation to the disk 4 from the shaft 1, the disk 4 has pivoted thereto one or more pawl levers 8 adapted to swing freely in the space 9 between opposed faces of the flange 3 and disk 4. The device may be operated by only one of these levers; or any desired number may be used, depending upon the power necessary to be transmitted to the machine intended to be operated thereby. Since all of these pawl levers are identical structurally and in mode of operation, it will be sufficient to describe one of them; with the understanding, as aforesaid, that any desired number may be used.

As shown in Figure 1, the lever 8 is pivoted to swing about a pin 10 having its axis parallel to the axis of the shaft 1. Quite close to the pivot pin 10, the pawl lever 8 is provided with a triangular pawl 11 adapted to seat in a correspondingly shaped notch 12 formed on the periphery of the flange 3. The remaining part of the lever 8 constitutes a weight operable somewhat in the manner of a centrifugal governor to decrease the driving torque as the speed of the machine increases.

The lever 8 at its free end is provided with a notch 13 adapted to form a clearance for one end of a coil spring 14. One shoulder 15 of the notch 13 is recessed to form a seat for a pin 16 (this pin may be integral with the lever 8) formed on a head 17 which serves as an abutment for one end of the coil spring. The head 17 has a pin 18 projecting perpendicularly therefrom; and this pin 18 is slidably mounted in a sleeve 19 extending perpendicularly from a second head 20 which is pivoted to swing about a pin 21 extending laterally from the disk 4 near the periphery thereof. The coil spring structure just described forms a sort of telescopic support for the compression spring 14; and serves also, with the lever 8, as a toggle linkage for automatically holding the pawl 11 either in the recess 12, or clear of the periphery of the flange 3 when swung to inoperative position by the camming force of the sides of the notch 12 when the disk 4 is subjected to an overload beyond a predetermined maximum.

The casing 5 is provided with a series of holes 22 arranged immediately to the rear of the joint between the links of the toggle formed by the pawl lever 8 and the telescopic compression spring structure. These holes 22 are designed to permit the passage of a screwdriver or similar tool to move the toggle linkage back to the positions necessary to cause engagement of the pawls 11 with the notches 12. It will be understood, of course, that during this operation, the casing 5 and disk 4 must be moved around until the pawl 11 is in position to be snapped into the recess 12 and to be held therein by the compression of the spring 14.

It will be evident from inspection of the drawing, and particularly from inspection of Figure 2, that I have provided a very compact overload release clutch in which the toggle linkages are enclosed in a casing and in a space provided between the driving and driven disks or flanges. The triangular driving pawl and the notch receiving recess are so designed as to equalize the load when the unit is operated in either direction.

It will be noted that the side of the notch 12 remote from the pivot 10 is steeper than the side nearer the pivot. The driving torque is, of course, tangential to the flange and this torque is transmitted through the V notch to the pawl 11. Neglecting friction, the force must be perpendicular to the slope of the notch and therefore for a given torque a radial component of the force will be produced depending upon the angle of the sides of said notch. The steeper slope on the remote side is required to make the load the same when the unit is operated in either direction since the length of the lever pawl from its pivot and the resistance to the force of the spring is greater on the remote side.

In operation, when the motor or other source of power is started, the full radial component of the spring pressure, multiplied by the leverage of the pawl lever over the pawl, is exerted to keep the pawl seated in the notch. The torque exerted by the power source produces a radial component of force tending to lift the pawl but under normal conditions is not sufficient actually to lift it. As the speed of rotation increases, the centrifugal force acting on the lever tends to lift the pawl away from its notch, thereby decreasing the effective force of the spring and requiring less torque to disengage the coupling.

If during the operation of the device the torque of the load is such that the radial component thereof, applied through the sloping side of the notch, together with the centrifugal force acting on the lever, is greater than the radial component of the spring pressure, then the pawl lever will move outwardly and, of course, carry out with it the pawl 11. As the lever moves outwardly the radial component of the spring pressure decreases while the centrifugal force increases. Therefore, even with a reduction in the torque, the lever will continue to move outwardly until the linkage snaps over into such position as to disengage the pawl from its notch. The disk 4 is then free to stop, while the flange 3 continues to rotate. When the disk 4 is brought to a stop, the arms of the toggle linkage can be reset by inserting a screwdriver or other suitable tool through the hole 22, while at the same time turning either the flange 3 or the disk 4 until the notch 12 is in alignment with the pawl 11. When the pawl snaps into the notch, the coupling is ready to carry the load.

In carrying out this invention it has been found advisable not to provide the springs with any screw adjustment to vary their degree of compression. It is preferable to secure this adjustment either by exchange of springs, or by inserting shims between the ends of the springs and the opposing heads of the telescopic toggle link. This method prevents tampering with the springs and makes the adjustment reasonably simple. As will be evident from the drawing, the springs are constructed so that they can be readily assembled or removed from the disk 4 and pawl lever 8. The weight of the levers must also be changed to suit various conditions of speed and overload and this is accomplished by variations in the holes shown.

It is thought that the invention and numerous of its attendant advantages will be understood from the foregoing description, and it is obvious that numerous changes may be made in the form, construction and arrangement of the several parts without departing from the spirit or scope of my invention or sacrificing any of its attendant advantages; the form herein described being a preferred embodiment for the purpose of illustrating my invention.

What I claim is:

1. In power transmission mechanism, a driving element having a circular periphery cut away to form opposed shoulders, a driven element spaced axially from the driving element, a lever positioned between said elements and pivoted at one end to said driven element and having a part at the pivoted end thereof adapted to contact with either shoulder, yielding means pivoted at one end to said driven element and pivoted at its other end to the free end of said lever, said yielding means and lever forming a toggle linkage for holding said part in contact with either of said shoulders to drive the driven element under a normal load and to yield when an abnormal load is imposed on the driven element to move and hold said part clear of the periphery of the driving element.

2. The device set forth in claim 1 in combination with a housing fixed to said driven element and extending over said periphery to enclose said linkage, said housing being provided with an aperture to give access to the toggle joint of said linkage.

3. In power transmission mechanism, a shaft, a flange fixed at right angles to said shaft and having a peripheral notch, a disk rotatable on said shaft and spaced axially from said flange, a lever pivoted at one end to and adjacent the periphery of the disk, said lever having its other end notched and having between its ends and closely adjacent its pivoted end an offset pawl adapted to engage the peripheral notch in the flange, a compression link pivoted at one end adjacent the periphery of the disk and adapted to engage by its other end one face of the notch in said lever to form therewith a toggle, the other face of said notch adapted to limit the break of said toggle.

JOHN EDGAR MONROE.